(12) United States Patent
Kamp et al.

(10) Patent No.: US 8,800,596 B2
(45) Date of Patent: Aug. 12, 2014

(54) HIGH OPENING VELOCITY CHECK VALVE

(75) Inventors: Joshua A. Kamp, Glastonbury, CT (US); George L. Kan, West Hartford, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 57 days.

(21) Appl. No.: 13/532,298

(22) Filed: Jun. 25, 2012

(65) Prior Publication Data

US 2013/0340862 A1   Dec. 26, 2013

(51) Int. Cl.
   *F16K 15/03*   (2006.01)
(52) U.S. Cl.
   USPC .................. 137/512.1; 137/527; 251/284
(58) Field of Classification Search
   USPC ............ 137/511, 512, 512.1, 315.16, 315.33; 251/64, 286
   See application file for complete search history.

(56) References Cited

U.S. PATENT DOCUMENTS

| | | | | |
|---|---|---|---|---|
| 3,072,141 | A | * | 1/1963 | Wheeler, Jr. ............... 137/512.1 |
| 3,074,427 | A | * | 1/1963 | Wheeler, Jr. ............... 137/512.1 |
| 3,384,112 | A | * | 5/1968 | Smith ......................... 137/512.1 |
| 3,538,946 | A | * | 11/1970 | Hilsheimer ................ 137/512.1 |
| 4,373,544 | A | | 2/1983 | Goodman et al. |
| 4,867,199 | A | * | 9/1989 | Marx ......................... 137/512.1 |
| 5,784,894 | A | | 7/1998 | Army, Jr. et al. |
| 5,836,349 | A | | 11/1998 | Kimberly et al. |
| 5,924,445 | A | | 7/1999 | Ambrose et al. |
| 6,851,255 | B2 | | 2/2005 | Aitchison et al. |
| 7,114,519 | B2 | | 10/2006 | Aitchison et al. |
| 7,422,029 | B2 | | 9/2008 | Denike et al. |
| 7,493,770 | B2 | | 2/2009 | Christianson et al. |
| 7,568,498 | B2 | | 8/2009 | Denike et al. |
| 7,779,859 | B2 | | 8/2010 | Denike et al. |
| 8,181,669 | B2 | | 5/2012 | Dehais et al. |
| 8,201,576 | B2 | | 6/2012 | Klein |
| 2008/0053536 | A1 | | 3/2008 | Denike et al. |
| 2008/0072973 | A1 | | 3/2008 | McGonigle et al. |
| 2008/0078458 | A1 | | 4/2008 | Denike et al. |
| 2008/0078459 | A1 | | 4/2008 | Warriner et al. |
| 2009/0071549 | A1 | | 3/2009 | Denike et al. |
| 2010/0282340 | A1 | | 11/2010 | Dehais et al. |

FOREIGN PATENT DOCUMENTS

| | | |
|---|---|---|
| EP | 2249068 A2 | 11/2010 |
| GB | 2096281 | * 10/1982 |

\* cited by examiner

*Primary Examiner* — John Rivell
*Assistant Examiner* — Kevin Barss
(74) *Attorney, Agent, or Firm* — Cantor Colburn LLP

(57) ABSTRACT

A check valve housing is provided and includes a base having opposite sides which are configured to form linear contact surfaces with check valve flappers pivotably disposed on either side of the base, respectively, and an additional structural member having opposite sides which are configured to form additional contact surfaces with each of the check valve flappers, respectively.

8 Claims, 6 Drawing Sheets

HIGH OPENING VELOCITY CHECK VALVE

BACKGROUND OF THE INVENTION

The subject matter disclosed herein relates to a check valve and, more particularly, to a high opening velocity check valve.

In bleed systems where fluid pressure can be tapped off from either a high pressure stage compressor or a low pressure stage compressor, a check valve is needed to prevent the high pressure stage bleed air from backflowing into the low pressure stage compressor. This check valve often includes flappers that occupy closed positions when the high pressure stage bleed air has a higher pressure than the low pressure stage compressor whereby the high pressure stage bleed air is prevented from backflowing into the low stage compressor. These flappers open when the pressure of the low pressure stage compressor exceeds that of the high stage bleed air.

When the flappers open, they often pivot at a relatively high angular velocity and impact the housing of the check valve, which is normally provided with a linear compliant stop. Opposite sides of the linear compliant stop form linear contact areas with each of the flappers that are each limited in size and their respective ability to absorb the impacts. Structurally withstanding the high opening velocities and the impacts between the compliant stop and the flappers has, thus, proven to be challenging.

BRIEF DESCRIPTION OF THE INVENTION

According to one aspect of the invention, a check valve housing is provided and includes a base having opposite sides which are configured to form linear contact surfaces with check valve flappers pivotably disposed on either side of the base, respectively, and an additional structural member having opposite sides which are configured to form additional contact surfaces with each of the check valve flappers, respectively.

According to another aspect of the invention, a check valve is provided and includes a body including a seat, a hinge bifurcating the seat to define openings and a housing coupled to the hinge and flappers pivotably coupled to the hinge to pivot in response to a pressure differential across the seat from respective closed positions at which the first and second flappers prevent fluid flow through the openings to respective open positions at which fluid flow through the openings is permitted. Opposite sides of the housing form linear and additional contact surfaces with each of the flappers, respectively, with the flappers occupying the respective open positions.

According to yet another aspect of the invention, a check valve interposed between upstream ductwork and downstream ductwork is provided and includes a body including a seat interposed between complementary ends of the upstream and downstream ductwork, a hinge bifurcating the seat to define openings and a housing coupled to the hinge and flappers pivotably coupled to the hinge to pivot in response to a pressure differential between the upstream and downstream ductwork from respective closed positions at which the first and second flappers prevent fluid flow through the openings to respective open positions at which fluid flow through the openings is permitted. Opposite sides of the housing form linear and additional contact surfaces with each of the flappers, respectively, with the flappers occupying the respective open positions.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

In accordance with aspects of the invention, a check valve is provided for use in bleed systems, for example. In such bleed systems, pressures can be tapped off from either a high pressure stage ("high stage") compressor or a low pressure stage ("low stage") compressor. The check valve serves to prevent high stage bleed air from backflowing into the low stage compressor and can withstand high opening and closing velocities of the check valve flappers.

Figure 1:
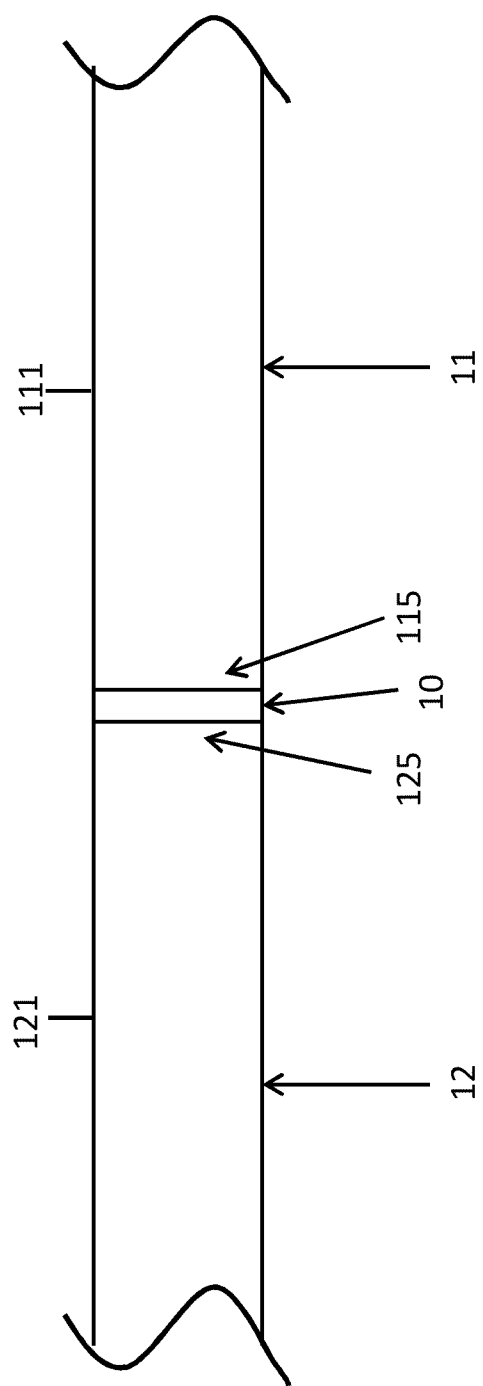
FIG. 1 is a schematic view of a check valve interposed between single ducts.
Figure 2:
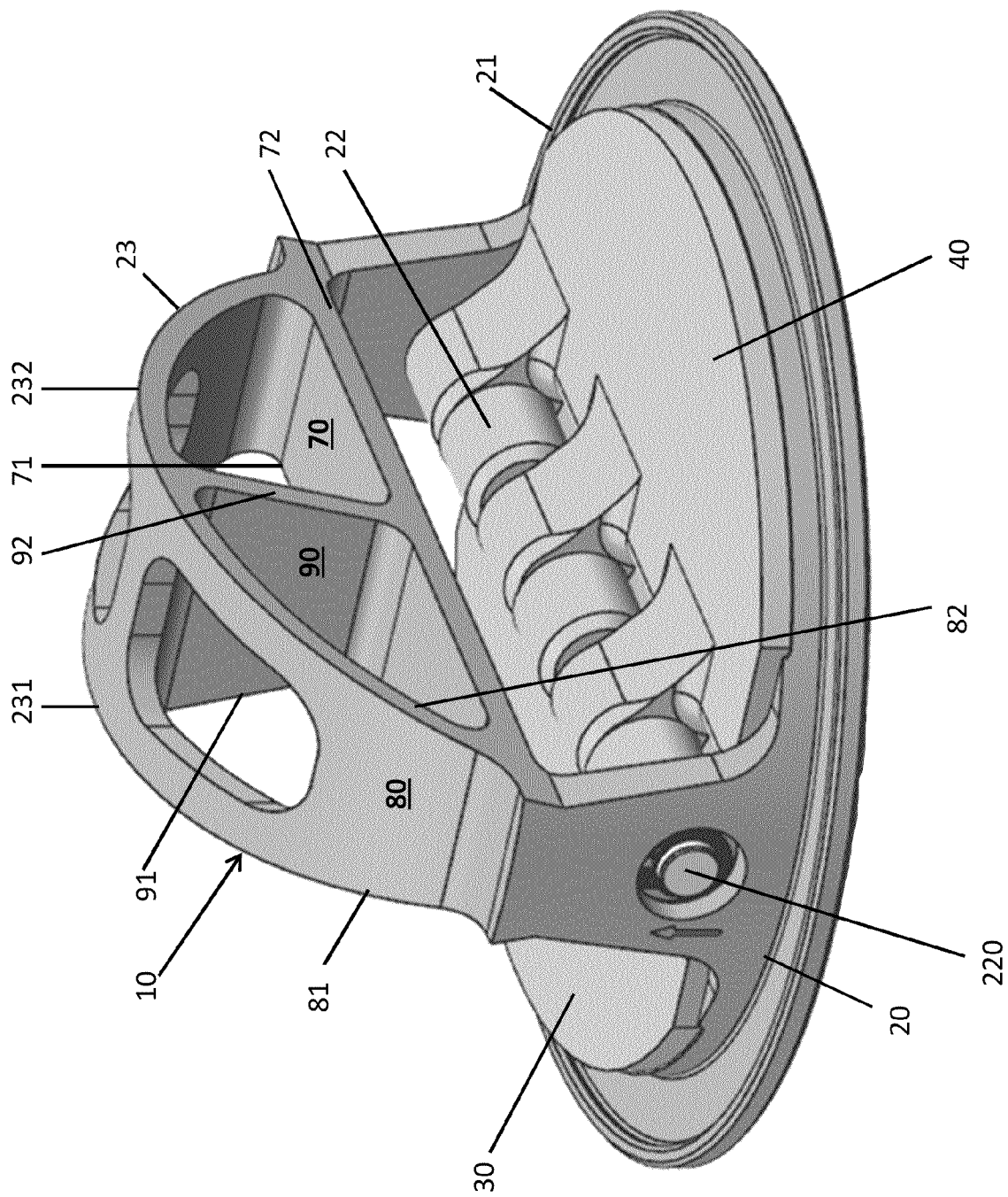
FIG. 2 is a perspective view of a check valve with flappers in respective closed positions.
Figure 3:
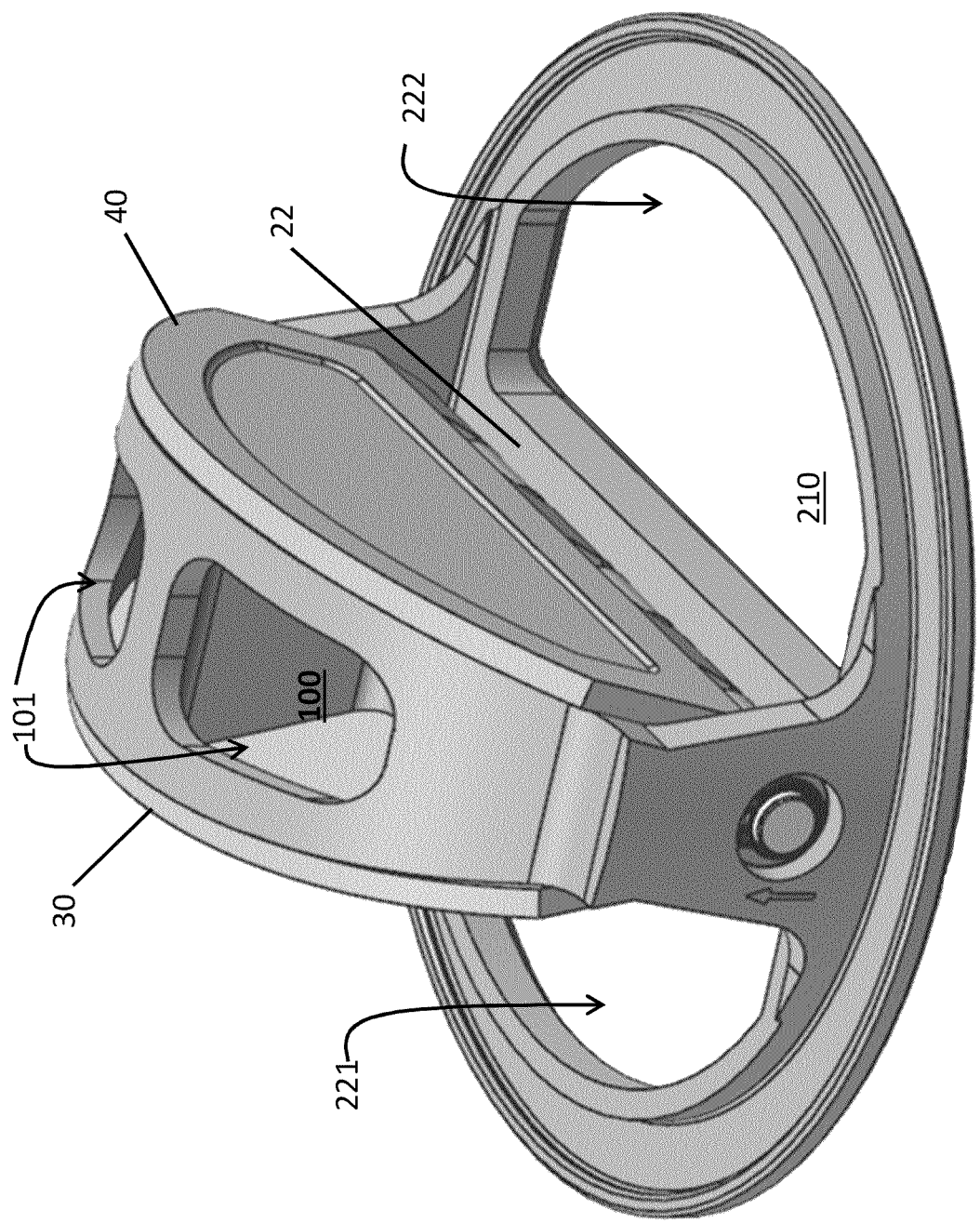
FIG. 3 is a perspective view of the check valve of FIG. 2 with the flappers in respective open positions.

With reference to FIGS. 1-3, a check valve 10 is provided. The check valve 10 is interposed between upstream ductwork 11 and downstream ductwork 12. As shown in FIG. 1, the upstream ductwork 11 is formed of a single duct 111 and the downstream ductwork 12 is similarly formed of a single duct 121. This configuration is, of course, exemplary, and it is to be understood that alternate configurations are possible and will be described below with reference to FIG. 5.

As shown in FIG. 2, the check valve 10 includes a check valve body 20 and first and second flappers 30 and 40. The check valve body 20 includes a seat 21, a hinge 22 and a housing 23. The seat 21 is annularly shaped and is formed to define an aperture 210 (see FIG. 3) that extends axially from an upstream end of the seat 21, which is associated with the upstream ductwork 11, to a downstream end of the seat 21, which is associated with the downstream ductwork 12. In accordance with embodiments, the seat 21 may be configured to fit onto the upstream ductwork 11 and the downstream ductwork 12 such that the seat 21 is fluidly interposed between an aft end 115 (see FIG. 1) of the upstream ductwork 11 and a complementary forward end 125 (see FIG. 1) of the downstream ductwork 12. The hinge 22 may be provided as a pin-hinge with a central pivot axis defined along a pin 220 and is disposed to bifurcate the aperture 210 defined by the seat 21 to thereby further define a first opening 221 (FIG. 3) on one side of the hinge 22 and a second opening 222 (FIG. 3) on the other side of the hinge 22. The housing 23 is coupled to opposite ends of the hinge 22.

The first and second flappers 30 and 40 are pivotably coupled to the hinge 22 to pivot about the central pivot axis in response to a fluid pressure differential between fluid disposed within the upstream ductwork 11 (i.e., high stage bleed fluid) and fluid disposed in the downstream ductwork 12 (i.e., fluid in the low stage compressor). In particular, the first and second flappers 30 and 40 are configured to pivot from respective closed positions at which the first and second flappers 30 and 40 prevent fluid flow through the first opening 221 and the second opening 222 to respective open positions at which fluid flow through the first opening 221 and the second opening 222 is permitted.

The housing 23 of the check valve body 20 has first and second opposite sides 231 and 232. The first side 231 is associated with the first opening 221 and the first flapper 30 while the second side 232 is associated with the second opening 222 and the second flapper 40. When the first and second flappers 30 and 40 are disposed in the respective closed positions, the first and second flappers 30 and 40 are displaced from the first and second sides 231 and 232. When the first and second flappers 30 and 40 pivot to the respective open positions, the first and second flappers 30 and 40 impact and make contact with the first and second sides 231 and 232, respectively. In such cases, with reference to FIG. 4, the first and second sides 231 and 232 form linear contact surfaces 50 with each of the first and second flappers 30 and 40, respectively, and additional contact surfaces 60 with each of the first and second flappers 30 and 40, respectively.

In accordance with embodiments, a pressure differential between the upstream ductwork 11 and the downstream ductwork 12 may be about 20 psi or more. At such pressures, the first and second flappers 30 and 40 may be disposed to pivot toward the respective open positions at an angular speed of about 150 radians per second or more.

Figure 4:
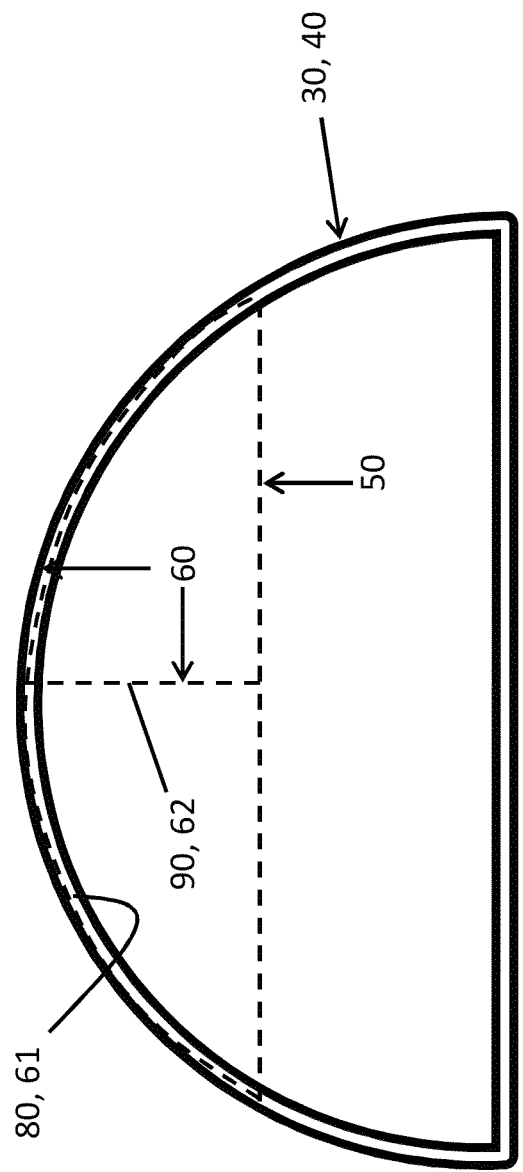
FIG. 4 is a side view of the linear and additional contact surfaces of the check valve of FIGS. 2 and 3.

As shown in FIG. 4, the additional contact surfaces 60 may include one or more arcuate surfaces 61, one or more linear surfaces 62 or a combination of one or more arcuate surfaces 61 and one or more linear surfaces 62. The configuration of the one or more linear contact surfaces 50 and the one or more additional contact surfaces 60 is defined by the overall structural components of the housing 23 of the check valve body 20. That is, as shown in FIGS. 2 and 3, the housing 23 includes a base 70 as well as at least one or both of an additional structural member 80 that may be arcuate in shape (i.e., an arcuate segment) and an additional structural member 90 that may be substantially linear in shape (i.e., a linear rib).

The base 70 may be but is not required to be substantially linear and has opposite sides 71 and 72. Where the base 70 is linear, the opposite sides are configured to form the linear contact surfaces 50 with each of the first and second flappers 30 and 40, respectively. Similarly, the additional, arcuate structural member 80 and the additional, linear structural member 90 each have opposite sides 81 and 82 and 91 and 92 that are configured to form the additional arcuate and linear contact surfaces 60 with each of the first and second flappers 30 and 40, respectively.

For the exemplary embodiment of FIGS. 2 and 3, the housing 23 has an "orange slice" configuration. That is, the base 70 is substantially flat and linear and the additional, arcuate structural member 80 arcs above the base 70. The additional, linear structural member 90 extends from the base 70 to the additional, arcuate structural member 80 to define spaces 100 (see FIG. 3) within the housing 23. Apertures 101 defined in the additional, arcuate structural member 80 (see FIG. 3) allow fluid flow into the spaces 100. Where the pressure of the fluid in the spaces 100 exceeds the pressure within the downstream ductwork 12, the pressure causes the first and second flappers 30 and 40 to pivot toward the respective closed positions.

Figure 5:
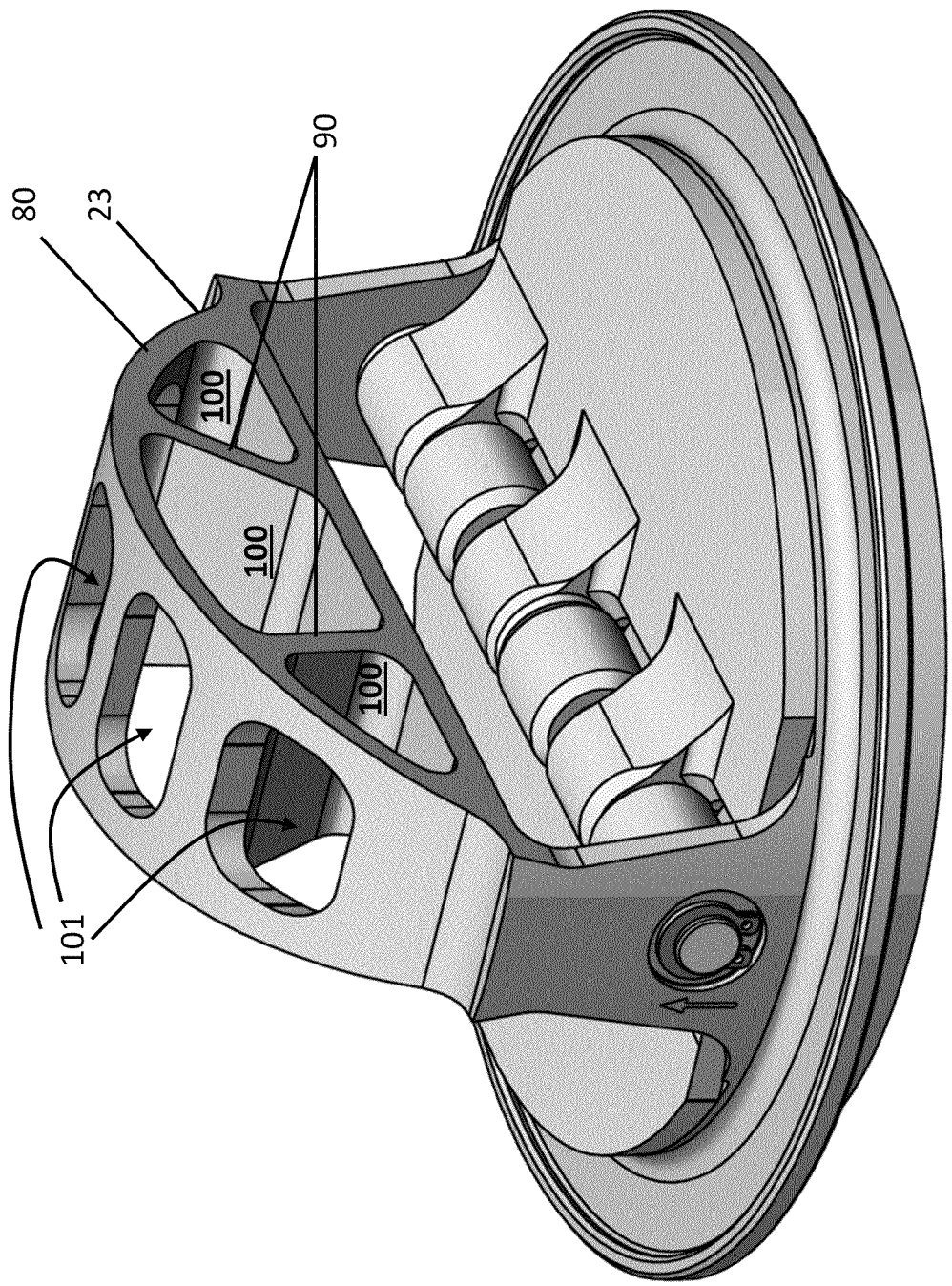
FIG. 5 is a perspective view of a check valve with flappers in respective closed positions in accordance with alternative embodiments.

In accordance with further and/or alternative embodiments and, with reference to FIG. 5, the additional, linear structural member 90 may be plural in number with additional apertures 101 defined in the additional, arcuate structural member 80. For example, two or three additional, linear structural members 90 may be provided at appropriate angles from one another to thereby define three spaces 100 within the housing 23. These three spaces 100 would each be chargeable by fluid passing through four corresponding apertures 101. In addition, the spaces 100 may also be provided with aerodynamic elements, such as airfoils and baffles, to direct fluid flow outwardly toward the first and second flappers 30 and 40.

As shown in FIG. 4, the distal ends of the first and second flappers 30 and 40 may have profile shapes that are substantially similar to the profile of the additional, arcuate structural member 80. Thus, when the first and second flappers 30 and 40 occupy the open positions, respective edges of the first and second flappers 30 and 40 may lie flush with complementary edges of the additional, arcuate structural member 80.

Figure 6:
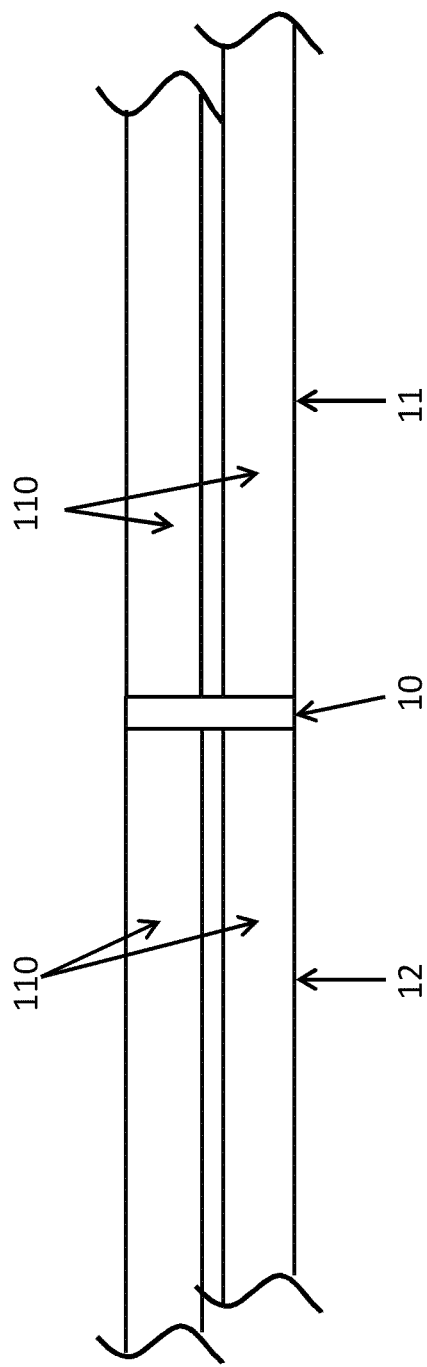
FIG. 6 is a schematic view of a check valve interposed between multiple ducts.

With reference to FIG. 6, at least one of the upstream ductwork 11 and the downstream ductwork 12 includes multiple ducts 110. For example, as shown in FIG. 6, both the upstream and the downstream ductwork 11 and 12 may include two ducts 110 each whereby corresponding ducts 110 in the upstream and downstream ductwork 11 and 12 communicate with one another by way of the first and second openings 221 and 222, respectively. In such cases, the first and second flappers 30 and 40 need not open and close together but it may be necessary to further bifurcate the spaces 100 within the housing 23 along a longitudinal axis of the hinge 22. Although illustrated as having a 1:1 ratio, it is to be understood that the upstream ductwork 11 and the downstream ductwork 12 need not have the same number of multiple ducts 110. That is, the two ducts 110 of the upstream ductwork 11 could lead to a single duct 110 in the downstream ductwork 12, for example.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A check valve housing, comprising:
a base having opposite sides which are configured to form linear contact surfaces with check valve flappers pivotably disposed on either side of the base, respectively; and
an additional structural member having opposite sides which are configured to form additional contact surfaces with each of the check valve flappers, respectively, the additional structural member comprising:
an arcuate segment being configured to form arcuate contact surfaces with the check valve flappers; and
a linear rib extending from the base to the arcuate segment and being configured to form with each of the check valve flappers additional linear contact surfaces extending between the linear and arcuate contact surfaces.

2. A check valve, comprising:

a body including a seat, a hinge bifurcating the seat to define openings and a housing coupled to the hinge; and flappers pivotably coupled to the hinge to pivot in response to a pressure differential across the seat from respective closed positions at which the first and second flappers prevent fluid flow through the openings to respective open positions at which fluid flow through the openings is permitted, the housing a base and an additional structural member the additional structural member comprising an arcuate segment and a linear rib extending from the base to the arcuate segment, opposite sides of the housing forming linear contact surfaces along the base, arcuate contact surfaces along the arcuate segment and additional linear contact surfaces along the linear rib that extend between the linear and arcuate contact surfaces with each of the flappers, respectively, with the flappers occupying the respective open positions.

3. The check valve according to claim 2, wherein, when pivoting toward the respective open positions, each of the flappers impacts the corresponding opposite side of the housing at an angular speed of about 150 radians/sec or more.

4. The check valve according to claim 2, wherein the pressure differential is about 20 psi.

5. A check valve interposed between upstream ductwork and downstream ductwork, comprising:

a body including a seat interposed between complementary ends of the upstream and downstream ductwork, a hinge bifurcating the seat to define openings and a housing coupled to the hinge; and flappers pivotably coupled to the hinge to pivot in response to a pressure differential between the upstream and downstream ductwork from respective closed positions at which the first and second flappers prevent fluid flow through the openings to respective open positions at which fluid flow through the openings is permitted, the housing comprising a base and an additional structural member, the additional structural member comprising an arcuate segment and a linear rib extending from the base to the arcuate segment, opposite sides of the housing forming linear contact surfaces along the base, arcuate contact surfaces along the arcuate segment and additional linear contact surfaces along the linear rib that extend between the linear and arcuate contact surfaces with each of the flappers, respectively, with the flappers occupying the respective open positions.

6. The check valve according to claim 5, wherein the upstream and downstream ductwork each comprise single ducts.

7. The check valve according to claim 5, wherein at least one of the upstream and downstream ductwork comprises multiple ducts.

8. The check valve according to claim 7, wherein the multiple ducts are respectively associated with the openings.

* * * * *